No. 659,839. Patented Oct. 16, 1900.
J. Q. ADAMS.
CORN SHELLER.
(Application filed Dec. 18, 1899.)
(No Model.) 5 Sheets—Sheet 2.
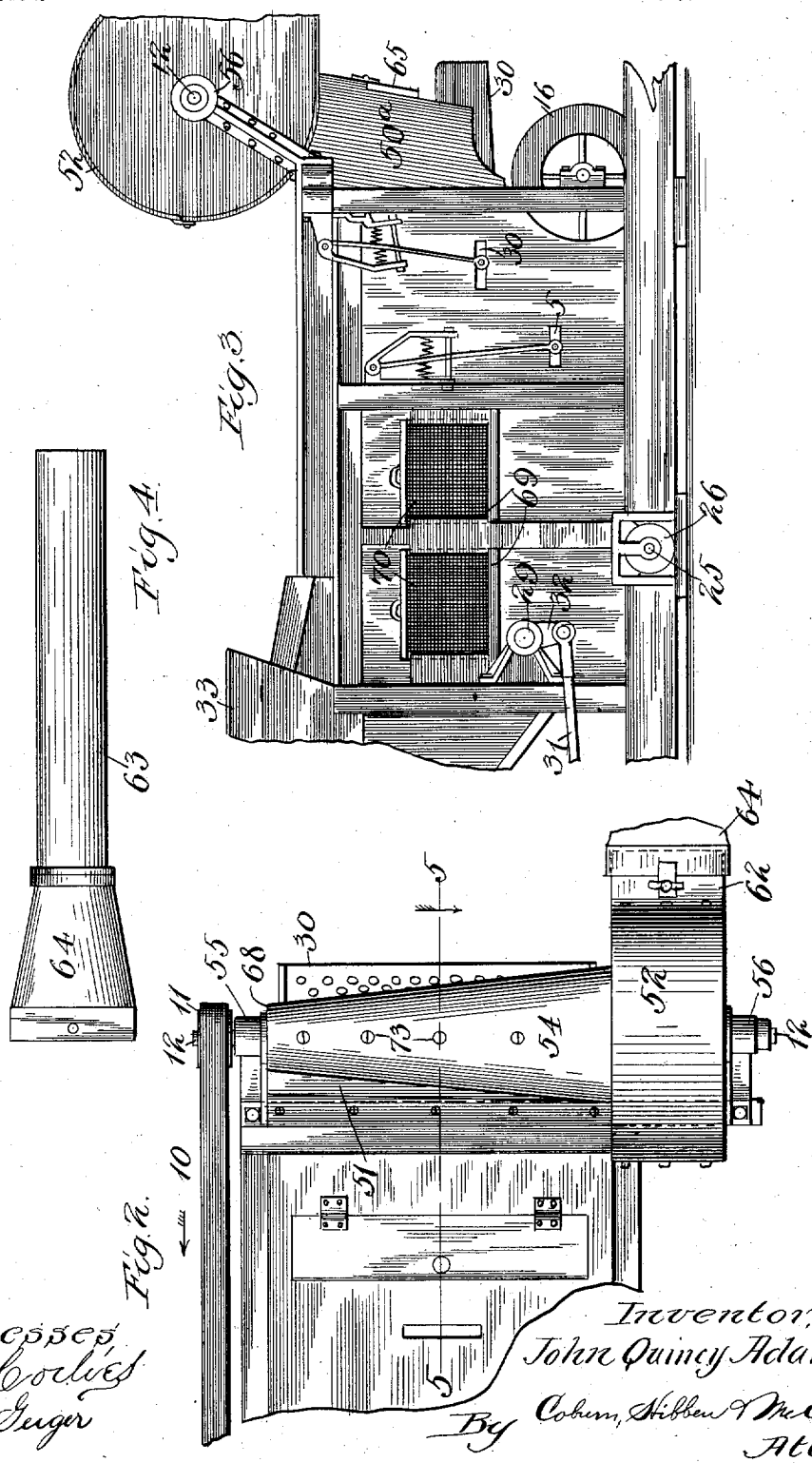
Witnesses
W. C. Corlies
Wm. Geiger
Inventor
John Quincy Adams,
By Cohen, Hibben & McElroy,
Attys

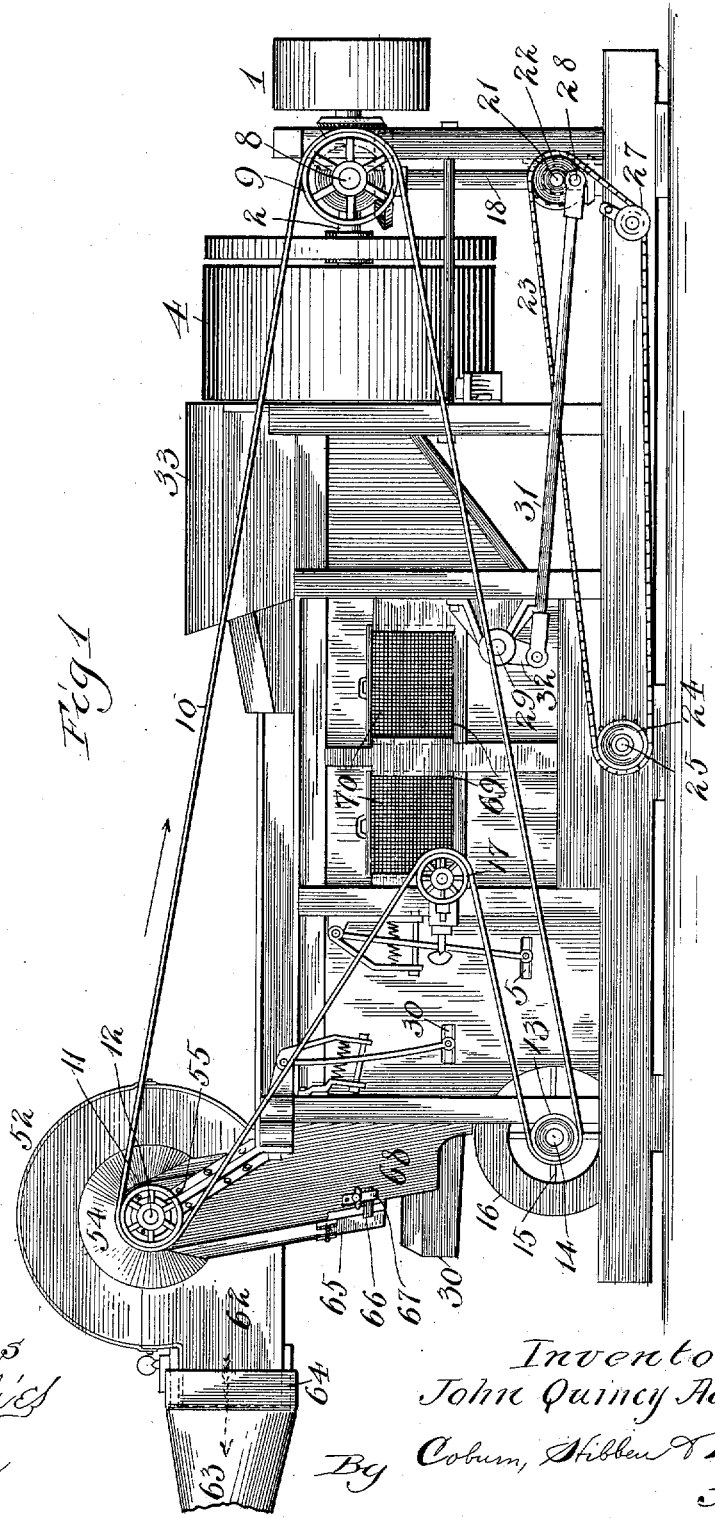

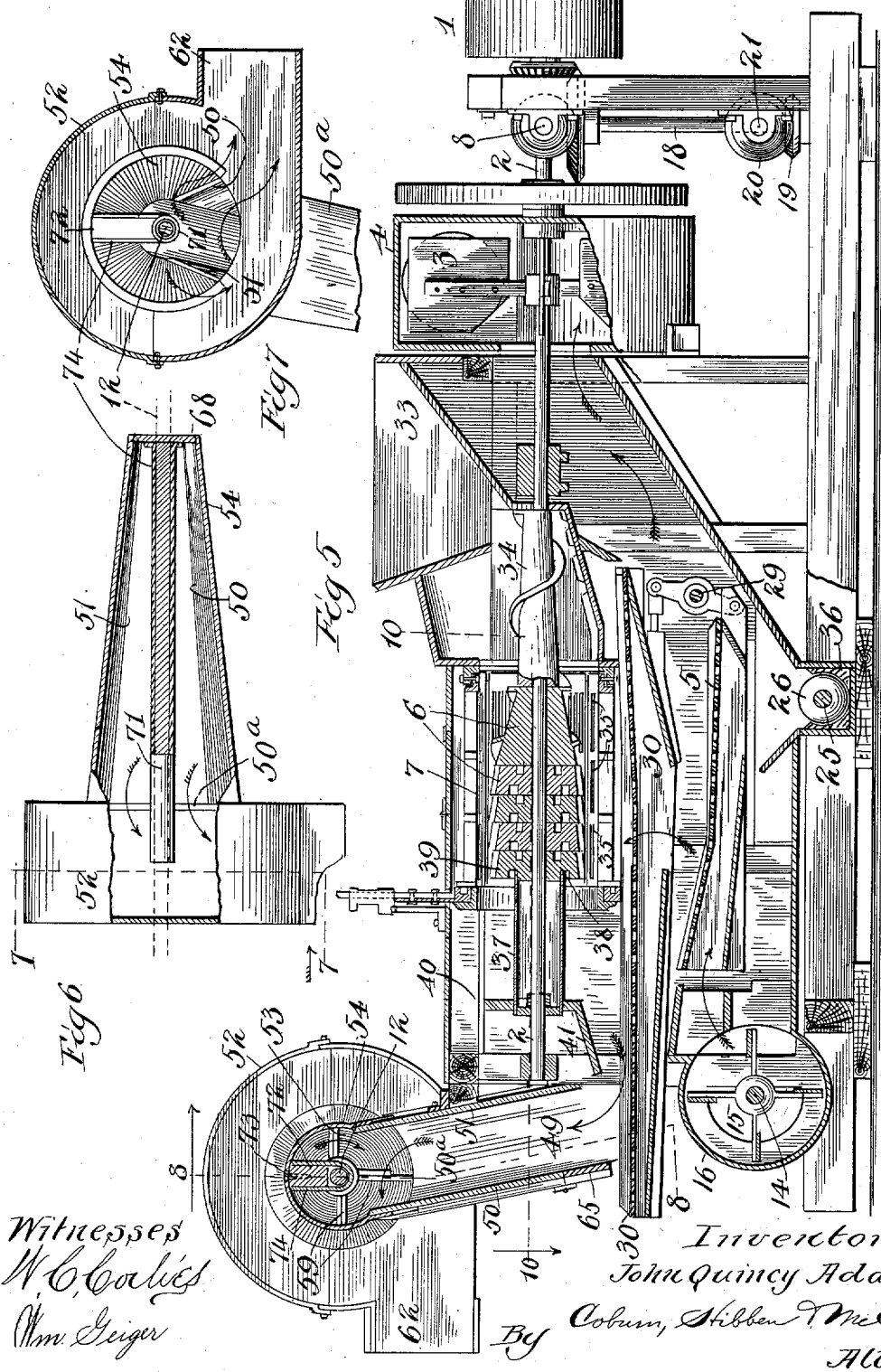

No. 659,839. Patented Oct. 16, 1900.
J. Q. ADAMS.
CORN SHELLER.
(Application filed Dec. 18, 1899.)
(No Model.) 5 Sheets—Sheet 4.
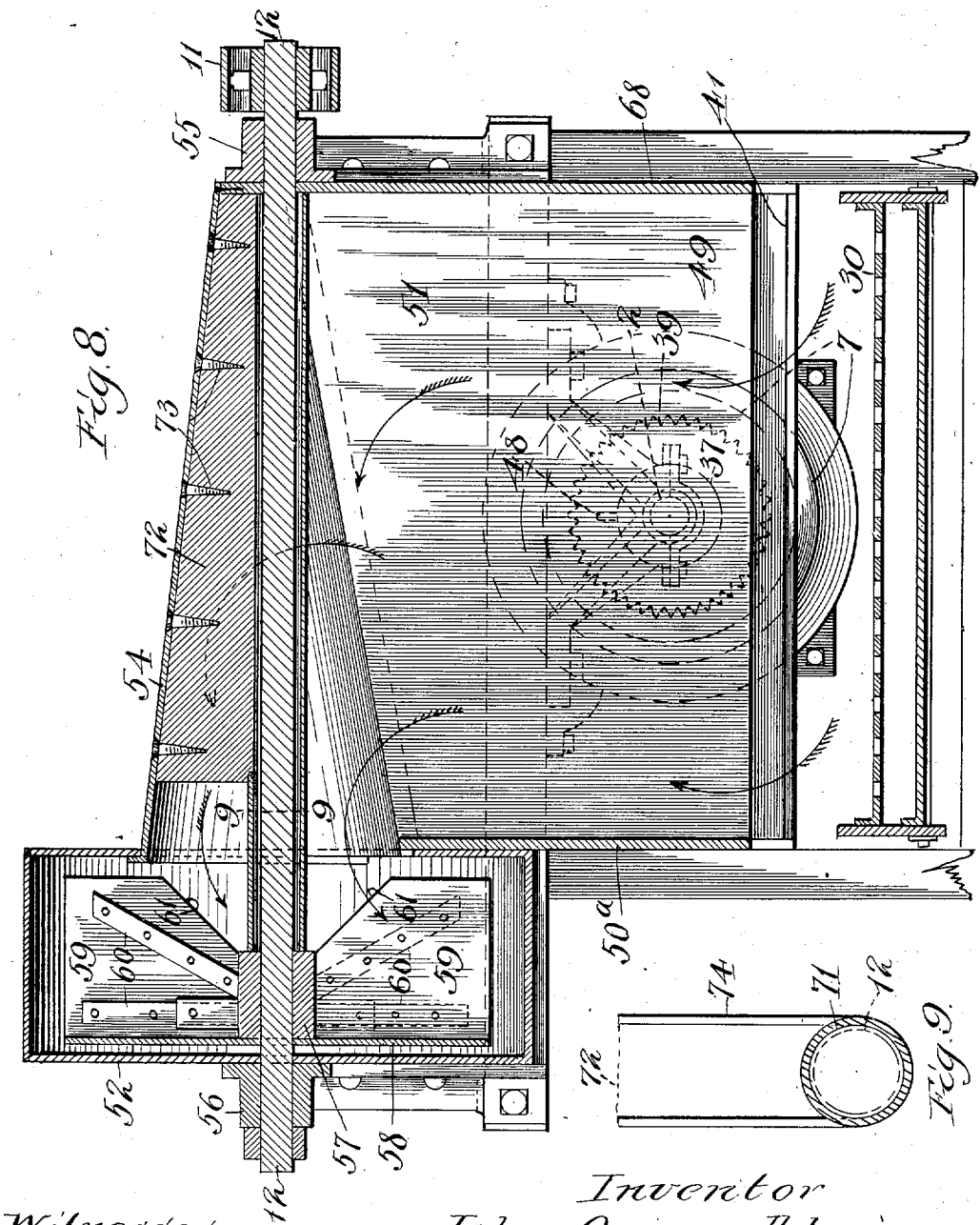
Witnesses
W. C. Coolies
Wm Geiger
Inventor
John Quincy Adams,
By Coburn, Hibben & McElroy,
Attys No. 659,839. Patented Oct. 16, 1900.
J. Q. ADAMS.
CORN SHELLER.
(Application filed Dec. 18, 1899.)
(No Model.) 5 Sheets—Sheet 5.
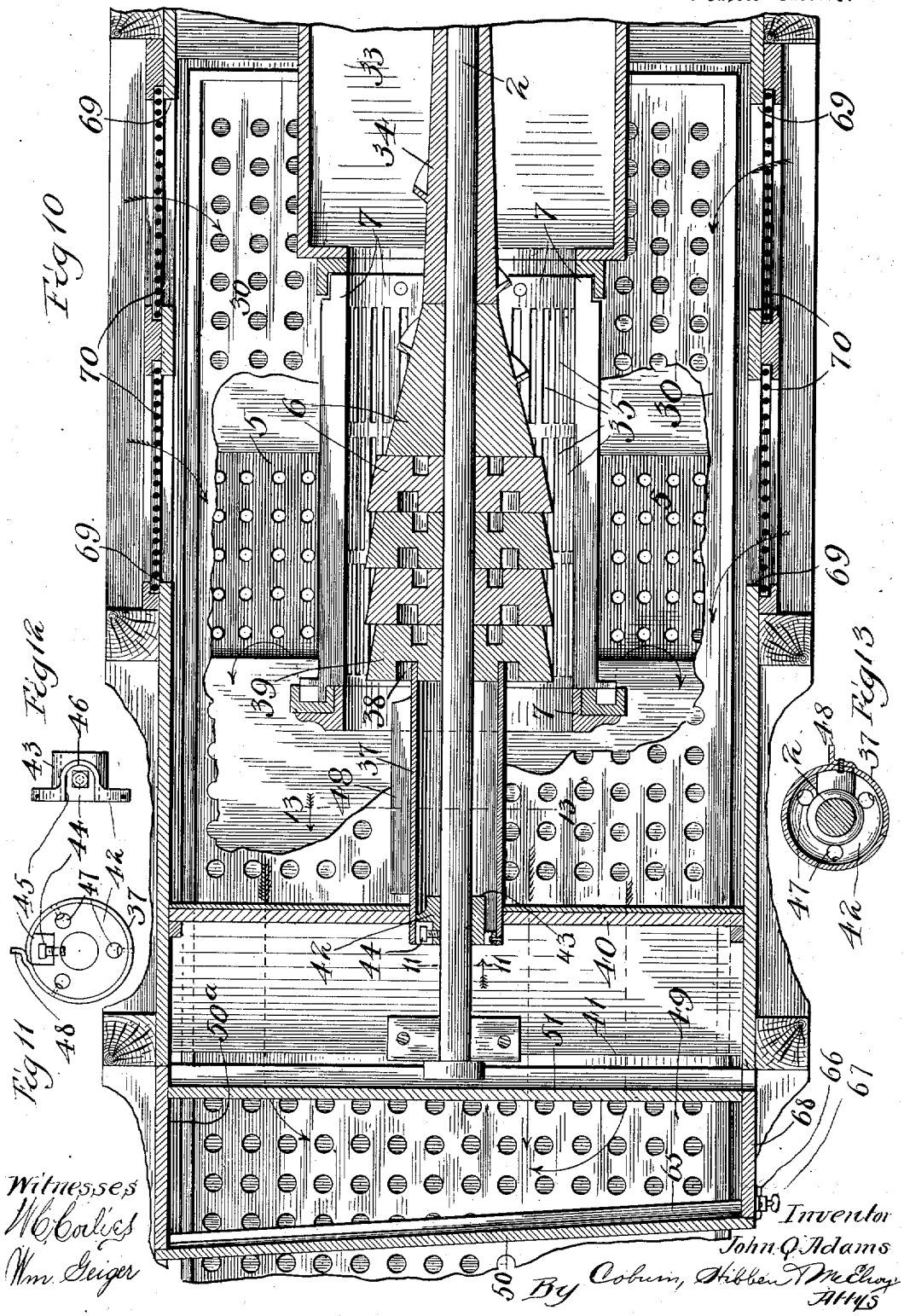
Witnesses
W. C. Coates
Wm. Geiger
Inventor
John Q. Adams
By Coburn, Hibben & McElroy
Attys

UNITED STATES PATENT OFFICE.

JOHN QUINCY ADAMS, OF MARSEILLES, ILLINOIS.

CORN-SHELLER.

SPECIFICATION forming part of Letters Patent No. 659,839, dated October 16, 1900.

Application filed December 18, 1899. Serial No. 740,665. (No model.)

*To all whom it may concern:*

Be it known that I, JOHN QUINCY ADAMS, a citizen of the United States, residing at Marseilles, in the county of La Salle and State of Illinois, have invented certain new and useful Improvements in Corn-Shellers, of which the following is a specification.

My invention relates to certain improvements in that class of corn-shellers which are known as "shuck-shellers," which are those that are intended to take corn which has been jerked from the stalk without removing the husks and to shell the corn in this state, thoroughly separating the corn and delivering it at one part of the machine, while subsequently separating the cobs and husks and delivering them at other separate points of the machine, and is mainly concerned with certain constructions employed in separating the husks from the cobs.

My invention involves a radically-new method of separation of the corn, cobs, shucks, and chaff and delivery to their respective destinations. As these machines have hitherto been constructed there has been no endeavor to separate the shucks from the dust, chaff, and other fine waste materials; but all have been delivered at one point from the machine. In my improved method of separation I separate the shucks not only from the corn and cobs, but also from the dust, &c., and in carrying out my invention I employ two distinct currents or blasts of air in the machine, one of which has its greater portion driven beneath the cob-riddle and through the corn-riddle, collecting all the dirt and chaff and carrying it to a chaff suction-fan, whence it is discharged, while the other current is drawn through the shelling-cylinder over the upper surface of the cob-riddle and upward from the end thereof, carrying with it all the shucks to another suction-fan, whence they are discharged.

While these improvements may be applied to different types of machines, I have shown them as preferably applied to my "New Process" sheller disclosed in my Patents No. 595,759, dated March 1, 1898, and No. 629,484, dated July 25, 1899.

Referring to the accompanying sheets of drawings, in which the same numerals of reference are used to designate identical parts in all the views, Figure 1 is a side elevation of the complete machine containing my improvements. Fig. 2 is a plan view of the suction-fan for removing the husks. Fig. 3 is a side elevation of a portion of the opposite side of the machine from that shown in Fig. 1. Fig. 4 is a plan view of a portion of the pipe for carrying away the husks. Fig. 5 is a side elevation of the complete machine with the parts connected with the separating and cleaning mechanism proper shown in central vertical section on the line 5 5 of Fig. 2. Fig. 6 is a plan view of the suction-fan for drawing off the husks, partly in section, on the line 6 6 of Fig. 7. Fig. 7 is a vertical section of the same mechanism on line 7 7 of Fig. 6. Fig. 8 is a substantially-vertical section on a somewhat larger scale on the line 8 8 of Fig. 5. Fig. 9 is a detail view on a still larger scale in section on the line 9 9 of Fig. 8. Fig. 10 is a horizontal section on the same scale as Fig. 8 and on the line 10 10 of Fig. 5. Fig. 11 is a detail in elevation on the line 11 11 of Fig. 10. Fig. 12 is a side elevation of the mechanism shown in Fig. 11, and Fig. 13 is a detail in section on the line 13 13 of Fig. 10.

Referring now especially to Figs. 1 and 5, 1 is the belt-wheel by which power is applied to the main driving-shaft 2, which is arranged horizontally lengthwise of the machine in suitable bearings and which has attached thereto the suction-fan 3, which is mounted in the casing 4 and serves to draw the chaff from the lower grain-riddle 5 in the manner fully disclosed in my prior patents. This shaft has the shelling-cylinder 6, which is constructed as described in my aforesaid patents and which coöperates with the concave 7, in which it is inclosed, and which serves to separate the corn from the ears and, to a certain extent, the shucks from the cobs. The shaft 2 has connected thereto by suitable gearing the relatively-short horizontal shaft 8, which has the belt-wheel 9 at its outer end, which, by means of the belt 10, transmits power to the pulley-wheel 11, secured on the end of the horizontal shaft 12 of the shuck suction-fan, to be more fully described hereinafter, and by the belt-wheel 13 on the shaft 14 to the blast-fan 15, which is mounted in a suitable casing 16 and serves to throw a blast of air mainly through and under the surface of the grain-riddle 5 to be drawn off by the suction-fan 3, as fully described in my aforesaid patent, No. 629,484. The belt-tightener wheel 17 is interposed between the wheels 11 and 13, as shown, and mounted by the mechanism on the side of the frame, so as to be adjustable for varying the tension of the belt. The shaft 1 is also geared, as best shown in Fig. 5, to the vertical shaft 18, which has the beveled gear 19 on its lower end meshing with the beveled gear 20 on the horizontal shaft 21, whose outer end carries the belt or sprocket wheel 22, which, by means of the belt or chain 23, passing over the belt or sprocket wheel 24, connected to the grain-conveyer shaft 25, serves to actuate the spiral 26, by which the corn is fed out to the delivery-spout (not shown) at the side of the machine. The belt or chain tightener 27 may be interposed between the belt or sprocket wheels 22 and 24, as shown, and the eccentric-pin 28 upon the wheel 22 may be conveniently used to impart reciprocating motion to the shaft 29, which is used for shaking the grain-riddle 5 and the cob-riddle 30 by the ordinary well-known mechanism, the connections between the wheel 22 and the shaft 29 being the link 31 and the arm 32.

The corn is fed into the hopper 33, whence it is forced by the spiral 34 on the shaft 2 into the shelling-concave, where the corn is shelled off from the cobs in the customary manner. The corn mostly falls through the openings 35 in the concave 7, whence it falls through the cob-riddle 30 onto the grain-riddle 5, where it is cleaned and from which it passes to the conveyer 26, arranged in the trough 36. A small portion of grain, however, may be carried out with the cobs and shucks from the left-hand end of the concave.

As the shaft 2 extends out beyond the end of the shelling-cone, 6 the shucks and cobs must pass over it in discharging from the concave; but if this small shaft were left uncovered, as has been the case heretofore, great difficulty would be caused by reason of the shucks catching on the shaft and winding around it, as it is almost impossible to prevent winding wherever a small rotating shaft is exposed. To obviate this difficulty, I provide a comparatively large sleeve 37, which surrounds the shaft 2 and rotates therewith, being supported at at its right-hand end by reason of taking over the innermost shoulder formed by the annular channel 38 in the outermost face of the disk 39, a plurality of which are used to make up the cone 6. The inner end of this sleeve 37 passes through a closely-fitting circular aperture in the partition 40, extending across the machine, as best shown in Figs. 5 and 10. The partition 40 and its inclined extension 41 serve to prevent any of the shucks reaching to the uncovered portion of the shaft 2. The left-hand end of the sleeve 37 is supported and secured to the shaft by the mechanism best shown in Figs. 10, 11, and 12, where it will be seen that a disk 42, having the collar 43, is secured to the shaft by the set-screw 44, which is located in the cavity 45 in the face of the disk 42 and which extends into the projection 46. The sleeve 37 is secured to the disk 42 by means of rivets passing through the sleeve and through radial holes leading to the holes 47 in the face of the disk 42, so as to permit the rivets to be inserted and headed conveniently in the assembling of the machine. To dislodge any shucks or other material that might tend to clog about the stationary parts of the machine between the partition 40 and the end of the concave 7, I provide the flange 48, extending radially from the sleeve 37 and conveniently formed, as shown in Fig. 13, by overlapping a portion of the sheet metal constituting the sleeve and turning up the edge thereof.

After the shucks and cobs are forced out of the concave they fall onto the surface of the riddle 30, whence they are worked outward beneath the extension 41 of the partition until they come to the bottom of the suction-truck 49, which, as will be seen best from Fig. 10, consists of the two plates or boards 50 and 51, extending upwardly between the ends 50$^a$ and 68 of the trunk, which ends form a continuation, as it were, of the sides of the machine at its left-hand end. These plates 50 and 51 are arranged at some inclination to a vertical line, so that they are parallel in one plane, while, as will be seen from Fig. 10, they are divergent toward the end where they join the casing 52 of the shuck suction-fan 53. The upper ends of these plates are connected by the conical-shaped casing 54, preferably constructed of sheet metal, which covers something more than one hundred and eighty degrees, and, as will be seen from Fig. 2, increases from a comparatively small diameter at the farthest end to quite a large diameter where the cone or funnel opens into the casing proper, 52, of the fan. The shaft 12 extends through the center of this cone, being journaled in the brackets 55 and 56, supported from the ends of the machine, as shown in Figs. 1 and 3. The suction-fan 53, as best shown in Fig. 8, consists of the hub 57, secured to the shaft and having the disk 58 adjacent to the outer end of the casing provided with the vanes 59, projecting radially from the hub 57 and braced by the strips 60. The vanes 59 are cut away, as at 61, about the center of the fan, so as to leave a considerable aperture through which the shucks may be drawn after having been drawn up with the suction-trunk 49 and the cone 54.

The action of the device as thus far described will be readily apparent. The shucks passing beneath the partition 41 are seized by the draft of air and carried up the suction-trunk 49, whence they are delivered into the fan-casing, from which they are delivered through the trunk 62 and into the pipe 63, which is connected to the trunk 62 by the funnel 64, which has its smaller end circular, to connect with the pipe 63, while its outer end is rectangular to fit over the trunk 62, to which it is secured. Of course it will be understood that the pipe 63 is extended to any point at which it is desired to deliver the shucks. By constantly increasing the area of the suction-trunk and the cone in the manner shown from the point of entry of the shucks to the point of discharge there is no possibility of the shucks clogging, as the space through which they can pass is constantly increasing. It is important to have the plates 50 and 51 arranged parallel in the one plane while diverging in the other, as if they were diverging from the bottom upward there would be the tendency in case of any obstruction for the shucks to wedge in the trunk and pile up there, so that the draft of air could not remove them, whereas with this construction no clogging can occur, and in case any of them fall back they will fall back to the riddle 30 and can be discharged with the cobs until the difficulty is remedied. At the lower end of the plate 50 I provide the pivoted extension 65, which is hinged to the plate 50, as shown in Fig. 5, and in order to hold this extension 65 in place against the tendency of gravity to wring it to a vertical position I provide the strap 66, which takes into the spring-clamp 67, secured to the end 68 of the suction-trunk.

As the supply of air delivered to the machine by the blast-fan 15 is not sufficient for both of the suction-fans, and as I desire the air for the shucks suction-fan to be drawn into the machine from the vicinity of the shelling-cylinder, I provide the apertures 69 in the sides of the machine, as shown in Figs. 1, 3, and 10, and cover these apertures with a coarse wire gauze or netting 70, that prevents the entrance of anything to the machine except the air, as well as the possible escape of any corn. As will be noted especially from Fig. 10, these apertures 69 are located somewhat beyond the concave, so that the air drawn into the machine passes around and through the concave, so as to assist in the delivery of the shucks from the concave and to start them in the direction of the suction-trunk. By reference to Fig. 5 it will be apparent that by this construction I have practically two distinct and separate currents of air passing through the machine in opposite directions. The lower one is supplied by the blast-fan 15 and drives the dust, chaff, &c., from the grain-riddle 5 out to the suction-fan 3 and thence to the outside of the machine. The upper one is supplied partially from the hopper-opening, but mainly from the openings 69, and a current of air is thus swept in an opposite direction through and alongside the shelling-cylinder and over the cob-riddle 30, and thence up the trunk 49, carrying with it the shucks, from which the dust and chaff connected with the grain have been largely removed, to the suction-fan 53, by which they are discharged to the atmosphere. These two air-currents are practically distinct and separate, although a small portion of the air for the upper one may be drawn up the opening in the cob-riddle 30 from the lower one.

It is necessary to make some provision to prevent the winding of the shucks about the shaft 12 for the same reasons that it was necessary to prevent their winding about the shaft 2; but I accomplish this in a somewhat different manner, inasmuch as instead of using a large sleeve revolving with the shaft I encase the shaft in a small stationary sleeve or tube 71, which surrounds it, as will be best seen in Fig. 8. This sleeve extends the entire length of the cone and up to the hub 57, so that no portion of the shaft 12 will be exposed to the shucks. To support this sleeve 71, I conveniently employ the wooden strip 72, which is secured to the under side of the top of the cone 54 by means of the screws 73, and the lower side of the strip 72 is employed to form the top of a portion of the sleeve 71, as the strip 72 has its sides covered by the sheet-metal plate 74, a portion of which is used to form the sleeve 71, while the rest of it is attached to the strip 72, as shown in Fig. 9.

While I have shown my invention as embodied in the form which I at present consider best adapted to carry out its purposes, it will be understood that it is capable of modifications and that I do not desire to be limited in the interpretation of the following claims, save as may be necessitated by the state of the art.

What I claim as new, and desire to secure by Letters Patent of the United States, is—

1. A machine of the class described, comprising the casing, a shelling mechanism located therein, a cob-riddle located beneath said shelling mechanism, a suction-fan for drawing the shucks, &c., from said cob-riddle, apertures in the casing adjacent to the shelling mechanism and located above the bottom of the cob-riddle and adapted to supply air to the shuck suction-fan, a grain-riddle located beneath said cob-riddle, a suction-fan for drawing the chaff, &c., from the grain-riddle, and connections for operating the shelling mechanism, shaking the riddles, and rotating said fans.

2. A machine of the class described, comprising the casing, a shelling mechanism located therein, a cob-riddle located beneath said shelling mechanism, a suction-fan for drawing the shucks, &c., from said cob-riddle, apertures in the casing adjacent to the shelling mechanism and located above the bottom of the cob-riddle and adapted to supply air to the shuck suction-fan, a grain-riddle located beneath said cob-riddle, a suction-fan for drawing the chaff, &c., from the grain-riddle, the blast-fan for driving a blast of air through and under the grain-riddle and to the chaff suction-fan, and connections for operating the shelling mechanism, shaking the riddles, and rotating said fans.

3. A machine of the class described, comprising the casing, a shelling mechanism located therein, a riddle located beneath said shelling mechanism, a suction-fan adjacent to one end of said riddle and adapted to draw shucks therefrom, and apertures in the sides of said casing above said riddle near the other end thereof and adjacent to the shelling mechanism so the air is drawn therethrough on either side of the shelling mechanism, over the surface of the riddle and to the suction-fan.

4. A machine of the class described, comprising the casing, a shelling mechanism centrally located therein, a riddle located beneath said shelling mechanism, a suction-trunk leading upward from one end of said riddle, a fan-casing located at the upper end of said suction-trunk, a suction-fan located in said casing and adapted to draw the shucks from said riddle, and apertures in the sides of said casing above said riddle at the other end thereof and adjacent to the shelling mechanism, so that air is drawn therethrough, over the surface of the riddle, and to the suction-fan.

5. A machine of the class described, comprising the casing, a shelling mechanism located therein, a riddle located beneath said shelling mechanism, a substantially-vertical suction-trunk leading upward from one end of said riddle and having its sides diverging in horizontal section from the far end toward the fan, but with its lower end as large as its upper end, a suction-fan casing located at the upper end of said trunk adjacent to the larger side, a suction-fan mounted in said suction-fan casing and adapted to draw the shucks from said riddle, and means for admitting the air to said casing adjacent to the shelling mechanism furnishing a supply for the suction-fan.

6. In a machine of the class described, the combination with the casing, of the shelling mechanism located therein, a riddle located beneath said shelling mechanism, a suction-trunk leading upward from the upper side of one end of the riddle, a suction-fan casing located at the upper end of said trunk, and a suction-fan mounted in said suction-fan casing and adapted to draw the shucks from said riddle, said suction-trunk having its capacity increased as it approaches the fan by having its sides diverging in horizontal section from the far end toward the fan but with its bottom end as large as its upper end.

7. In a machine of the class described, the combination of the shaft 2, having the shelling-cylinder thereon, the sleeve 37 surrounding a portion of said shaft adjacent to the shelling-cylinder, and secured thereon by the disk 42 having the recess 45 with the set-screw 44 in said recess passing through the collar 43 to which the disk 42 is secured.

8. In a device of the class described the combination of the shaft 2 having the shelling-cylinder 6 mounted thereon and composed of the sections 39, the outermost of said sections being provided with the annular channel 38, the collar 43 secured on said shaft by the set-screw, and having the disk 42 thereon, and the sleeve 37 secured to the periphery of said disk, and extending into the channel 38, substantially as and for the purpose described.

9. In a device of the class described, the suction-trunk located at the end of the cob-riddle, and composed of the ends, and the sides or plates 50 and 51 extending upward at the same angle, and diverging from one side to the other, a conical hood covering the top of said trunk, a fan-casing located at the larger end of the hood, and a fan in said casing.

10. In a device of the class described, the suction-trunk located at the end of the cob-riddle, and composed of the ends and the sides or plates 50 and 51 extending upward at the same angle, and diverging from one side to the other, a conical hood covering the top of said trunk, a fan-casing located at the larger end of the hood, and a fan in said casing, said fan consisting of the hub 57, the disk 58, and the fan 59, all coöperating substantially as and for the purpose described.

11. In a device of the class described, the suction-trunk terminating in the conical hood, the fan-casing located at the larger end of said hood, the shaft extending through said fan-casing and said hood and suitably journaled therein, the fan mounted in said fan-casing, and a sleeve surrounding said shaft throughout its length in said hood and to the fan, and means for supporting said sleeve and preventing its rotation.

12. In a device of the class described, the combination of the fan-casing, the hood adjacent thereto, a shaft extending through said hood and casing, a fan secured upon said shaft and occupying the fan-casing, and a sleeve 71 surrounding said shaft from the fan to the opposite end of the hood, and means for supporting the tube 71 consisting of the piece 72 connected therewith and secured to the under side of the top of the hood, substantially as shown and described.

13. In a device of the class described, the combination with the suction-fan and casing therefor, of the suction-trunk leading thereto at an angle to the vertical, and having the pivoted portion 65 of the outer side, provided with the strap 66 coöperating with the clamp 67, substantially as and for the purpose described.

14. A machine of the class described, comprising the shelling mechanism, a riddle located adjacent to said shelling mechanism, and a suction-fan for drawing a current of air over the surface of said riddle and from one end thereof to carry off the shucks, &c.; a grain-riddle located beneath said cob-riddle, and a suction-fan for drawing a current of air through and over said grain-riddle, and beneath said cob-riddle and in an opposite direction from the other current to draw off the chaff, &c.; and connections for operating the shelling mechanism, shaking the riddles and rotating said fans.

15. A machine of the class described, comprising a casing in which is located shelling mechanism, a cob-riddle located adjacent to said shelling mechanism, and a suction-fan at one end of the machine for drawing the shucks, &c., along the surface of said cob-riddle and raising them from one end thereof; a grain-riddle located beneath said cob-riddle, and a suction-fan located at the other end of the machine for drawing the chaff, &c., from the grain-riddle by a current of air beneath the other current and flowing in an opposite direction; and connections for operating the shelling mechanism, shaking the riddles and rotating said fans.

16. A machine of the class described, comprising the casing in the upper part of which the shelling mechanism is located; a cob-riddle located adjacent to said shelling mechanism, apertures in the upper portion of said casing near one end, and a suction-fan for a current of air through said aperture and over the riddle, for raising the shucks from one end thereof; a grain-riddle located beneath said cob-riddle, an aperture in the lower portion of the casing adjacent to the end opposite the one in which the upper apertures are located, and a suction-fan for drawing a current of air through said lower aperture to carry the chaff, &c., from the grain-riddle; and connections for operating the shelling mechanism, shaking the riddles, and rotating said fans.

17. A machine of the class described, comprising the casing in the upper part of which the shelling mechanism is located; a cob-riddle located adjacent to said shelling mechanism, apertures in the upper portion of said casing near one end, and a suction-fan for drawing a current of air through said apertures and over the riddle for raising the shucks from one end thereof; a grain-riddle located beneath said cob-riddle, an aperture in the lower portion of the casing adjacent to the end opposite the one in which the upper apertures are located, a blast-fan in connection with said aperture; and a suction-fan for drawing the current of air from said blast-fan through and beneath the grain-riddle to carry the chaff therefrom; and connections for operating the shelling mechanism, shaking the riddles, and rotating said fans.

18. A machine of the class described, comprising a casing, in the upper portion of which a shelling mechanism is located, a cob-riddle located adjacent to said shelling mechanism, apertures located in the side of the casing and slightly beyond the shelling mechanism in the direction of the feed-hopper therefor, and a suction-fan for drawing a current of air through the hopper-opening and said side openings, and over the surface of the riddle to carry the shucks, &c., from the opposite end thereof; a grain-riddle located beneath said cob-riddle, a blast-fan adjacent to the end of said riddle farthest from the hopper, and a suction-fan at the end of the machine adjacent to the hopper for drawing a current of air carrying the chaff, &c., from the grain-riddle; and connections for operating the shelling mechanism, shaking the riddles, and rotating said fans.

JOHN QUINCY ADAMS.

Witnesses:
LOUISE E. SERAGE,
HATTIE O. HALVORSON.